United States Patent
Ober et al.

(10) Patent No.: US 8,975,348 B2
(45) Date of Patent: Mar. 10, 2015

(54) NON-AQUEOUS COMPOSITION COMPRISING PARTIALLY FLUORINATED METHACRYLIC POLYMERS

(75) Inventors: Michael Henry Ober, Newark, DE (US); Ernest Byron Wysong, Hockessin, DE (US); Timothy Edward Hopkins, Wilmington, DE (US); Andrew Hen Liu, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 275 days.

(21) Appl. No.: 13/010,960

(22) Filed: Jan. 21, 2011

(65) Prior Publication Data

US 2011/0200829 A1    Aug. 18, 2011

Related U.S. Application Data

(60) Provisional application No. 61/303,737, filed on Feb. 12, 2010.

(51) Int. Cl.
| | | |
|---|---|---|
| C09D 133/16 | (2006.01) | |
| C04B 41/00 | (2006.01) | |
| C04B 41/48 | (2006.01) | |
| C08F 220/24 | (2006.01) | |
| C14C 9/00 | (2006.01) | |
| C08F 220/18 | (2006.01) | |
| C08F 220/28 | (2006.01) | |

(52) U.S. Cl.
CPC ............ C09D 133/16 (2013.01); C04B 41/009 (2013.01); C04B 41/4842 (2013.01); C08F 220/24 (2013.01); C14C 9/00 (2013.01); C08F 220/18 (2013.01); C08F 2220/281 (2013.01)
USPC ... 526/245; 524/544; 427/427.4; 427/428.01; 427/430.1

(58) Field of Classification Search
CPC .......................... C04B 41/4842; C09D 133/16
USPC ........................................... 526/245; 524/544
See application file for complete search history.

(56) References Cited

U.S. PATENT DOCUMENTS

| | | | | |
|---|---|---|---|---|
| 3,459,696 | A * | 8/1969 | Read .............................. | 524/512 |
| 4,141,755 | A | 2/1979 | Weiss et al. | |
| 4,478,975 | A * | 10/1984 | Dessaint et al. ............... | 524/871 |
| 5,055,538 | A | 10/1991 | Amimoto et al. | |
| 5,061,769 | A * | 10/1991 | Aharoni ........................ | 526/245 |
| 5,177,154 | A | 1/1993 | Moro | |
| 5,344,903 | A * | 9/1994 | Raiford et al. ................ | 526/245 |
| 5,876,617 | A | 3/1999 | Sato et al. | |
| 6,130,298 | A | 10/2000 | Yamana et al. | |
| 6,191,244 | B1 | 2/2001 | Lau et al. | |
| 6,235,814 | B1 | 5/2001 | Bowe | |
| 6,451,717 | B1 | 9/2002 | Fitzgerald et al. | |
| 6,472,476 | B1 | 10/2002 | Soane et al. | |
| 6,479,605 | B1 | 11/2002 | Franchina | |
| 7,101,924 | B2 | 9/2006 | Von Schmittou et al. | |
| 7,196,133 | B2 * | 3/2007 | Hosoda et al. ................ | 524/545 |
| 2005/0043478 | A1 | 2/2005 | Huang et al. | |
| 2005/0267241 | A1 | 12/2005 | Sugimoto et al. | |
| 2007/0066780 | A1 | 3/2007 | Ueda et al. | |
| 2007/0197717 | A1 | 8/2007 | Ueda et al. | |
| 2008/0146758 | A1 * | 6/2008 | Murphy et al. ............... | 526/245 |
| 2008/0202384 | A1 | 8/2008 | Peng et al. | |
| 2011/0077349 | A1 * | 3/2011 | Hoshino ....................... | 524/544 |

FOREIGN PATENT DOCUMENTS

| | | |
|---|---|---|
| JP | 50004800 | 2/1975 |
| JP | 58197374 A | 11/1983 |
| JP | 04-080217 A | 3/1992 |
| JP | 05-214198 A | 8/1993 |
| JP | 06-240239 A | 8/1994 |
| JP | 2005054020 A | 3/2005 |
| JP | 2005146102 A | 6/2005 |
| JP | 2006328624 A | 12/2006 |
| JP | 2009035689 A | 2/2009 |
| WO | 2005087826 A1 | 9/2005 |
| WO | 2007080055 A3 | 7/2007 |
| WO | 2008000681 A1 | 1/2008 |
| WO | 2008022985 A1 | 2/2008 |

(Continued)

OTHER PUBLICATIONS

Chen et al., Morphology of Perfluoroalkylacrylate/Stearyl Methacrylate Polymers and their Effect on Water/Oil Repellency, Journal of Polymer Science, 1997, 63, 7, John Wiley & Sons, Inc.
Gao et al., Abstract of Study on the Preparation and Surface Properties of Fluoroacrylate Copolymer-based Anti-Adherent, 2007.

(Continued)

Primary Examiner — Nicole M Buie-Hatcher

(57) ABSTRACT

A solvent-based non-aqueous fluorinated methacrylate polymer comprising repeating units in any sequence from (1) at least one fluorinated methacrylate, and (2) at least one non-fluorinated alkyl acrylate and (3) at least one non-fluorinated hydroxyalkyl methacrylate, provided that a) the repeating unit of fluorinated methacrylate is present in a range of about 40%-80% by weight of total monomers added, b) the repeating unit of non-fluorinated alkyl acrylate is present in a range of about 10%-35% by weight of total monomers added, and c) the repeating unit of non-fluorinated hydroxyalkyl methacrylate is present in a range of about 5%-25% by weight of total monomers added, and d) the total of all repeating units is 100% by weight.

8 Claims, No Drawings

(56) References Cited

FOREIGN PATENT DOCUMENTS

| | | |
|---|---|---|
| WO | 2008136435 A1 | 11/2008 |
| WO | 2008136436 A1 | 11/2008 |
| WO | 2008153075 A1 | 12/2008 |
| WO | 2009008512 A1 | 1/2009 |
| WO | 2009041650 A1 | 4/2009 |
| WO | 2009047943 A1 | 4/2009 |

OTHER PUBLICATIONS

Honda et al., Molecular Aggregation Structure and Surface Properties of Poly(fluoroalkylacrylate) Thin Films, Macromolecules, 2005, 38, 13 5699-5705, ACS Publications.

Kissa, FluorinatedSurfactants, Syntheses—Properties—Applications, Surfactant Science Series, 1993, 50, pp. 22-36, Marcel Dekken Inc.

* cited by examiner

NON-AQUEOUS COMPOSITION COMPRISING PARTIALLY FLUORINATED METHACRYLIC POLYMERS

FIELD OF THE INVENTION

This invention relates to a solvent based (i.e., non-aqueous) fluorinated methacrylic polymer, the manufacture thereof, and the methods of use thereof on leather and hard surface substrates to provide water and oil repellency, and stain resistance.

BACKGROUND OF THE INVENTION

Most commercially available fluorinated acrylic polymers as as water/oil repellents or stain resist produced through electrochemical fluorination or telomerization. Electrochemical fluorination utilizes anhydrous hydrofluoric acid as the fluorine source. However, industrially produced hydrofluoric acid contains impurities; which requires further complicated methods to remove these impurities.

Telomerization processes use tetrafluoroethylene as the starting material. However, tetrafluoroethylene is expensive intermediate with limited availability. The telomerization products contain a mixture of homologs which contain a distribution of different carbon chain lengths. Therefore, in order to produce fluorinated surfactants which contain a fixed length of the fluorinated carbon chain, some sequential separation of telomerization products is required, as described by Erik Kissa in "Fluorinated Surfactants, Synthesis-Properties-Applications".

For example, U.S. Pat. No. 7,101,924 discloses an acid treated, aqueous dispersion which provides oil and water-repellency comprising a polymer, at least one water-dispersible polyester, water and at least one acid-generating compound; wherein said polymer comprises repeating units from at least one fluoroalkyl monomer and optionally at least one ethylenically unsaturated monomer; wherein said fluoroalkyl monomer is a (meth)acrylate. The suitable substrate of aobve oil and water repellents described in '924 is selected from the group consisting of a yarn, thread, fiber, fabric, paper and carpet.

Historically, many repellents, such as described above in Examples in '924, contain perfluoroalkyl groups having 6 and above carbon chain length. For example, Koji Honda et al., in "Molecular Aggregation Structure and Surface Properties of Poly(fluoroalkylacrylate) Thin Films" Macromolecules (2005), 38(13), 5699-5705, teach that the orientation of the perfluoroalkyl chains of at least 6 carbons is maintained in a parallel configuration, while for such perfluoroalkyl chains containing 6 or less carbons, reorientation occurs. This reorientation decreases effects for altering surface behaviors.

Nevertheless, there is a disadvantage of using such fluorinated materials containing longer perfluoroalkyl chains since the high price of fluorinated material is determined by the amount of fluorine incorporated in compound. Therefore, it is desirable to obtain fluorinated repellents which can be prepared from fluorinated chemicals with short and exact chain length perfluoroalkyl groups. It is further desirable that such such fluorinated repellents with short and exact chain length perfluoroalkyl groups still provide essentially the same or even superior performance.

It is unexpectedly discovered in the present invention that a solvent based fluorinated methacrylic polymer which contains fluorinated groups having exact 6 carbon chain length can provide the desired oil and water repellency, and stain resistance properties to the treated substrates including leather, and hard surface substrates.

Furthermore, conventionally in fiber treatment applications, the fluoroalkyl(meth)acrylate monomer is copolymerized with at least one ethylenically unsaturated monomer such as a methacrylate or acrylate as described in '924. The fluorinated methacrylic polymer in the present invention is prepared by the copolmerization of repeating units from at least one fluorinated methacrylic monomer and at least one non-fluorinated acrylate. It is unexpectedly discovered that the non-fluorinated acrylate is preferred, and non-fluorinated methacrylate is particularly excluded in this invention in order to render the solvent based fluorinated methacrylic polymer desired oil and water repellency, and stain resistance properties to the treated substrates including leather, and hard surface substrates.

SUMMARY OF THE INVENTION

A solvent-based fluorinated methacrylate polymer composition comprises repeating units in any sequence from (1) at least one fluorinated methacrylate, and (2) at least one non-fluorinated alkyl acrylate and (3) at least one non-fluorinated hydroxyalkyl methacrylate, provided that a) the repeating unit of fluorinated methacrylate is present in a range of about 40%-80% by weight of total monomers added, b) the repeating unit of non-fluorinated alkyl acrylate is present in a range of about 10%-35% by weight of total monomers added, and c) the repeating unit of non-fluorinated hydroxyalkyl methacrylate is present in a range of about 5%-25% by weight of total monomers added, and d) the total of all repeating units is 100% by weight.

DETAILED DESCRIPTION

Herein trademarks are shown in upper case.

The present invent relates to a solvent-based fluorinated methacrylate polymer composition comprises repeating units in any sequence from (1) at least one fluorinated methacrylate, and (2) at least one non-fluorinated alkyl acrylate and (3) at least one non-fluorinated hydroxyalkyl methacrylate, provided that a) the repeating unit of fluorinated methacrylate is present in a range of about 40%-80% by weight of total monomers added, b) the repeating unit of non-fluorinated alkyl acrylate is present in a range of about 10%-35% by weight of total monomers added, and c) the repeating unit of non-fluorinated hydroxyalkyl methacrylate is present in a range of about 5%-25% by weight of total monomers added, and d) the total of all repeating units is 100% by weight.

The above solvent-based fluorinated methacrylate polymer is prepared polymerization of fluorinated methacrylate monomer with other monomers as detailed below.

The fluorinated methacrylate monomers suitable for the use in the present invention are:

$CF_3(CF_2)_5$—$CH_2CH_2$—$OC(O)$—$C(CH_3CH_2$,
$C_6F_{13}$—$CH_2CH_2$—$OC(O)$—$C(CH_3)$=$CH_2$,
$C_6F_{13}$—$R^2$—$SC(O)$—$C(CH_3)$=$CH_2$,
$C_6F_{13}$—$R^2$—$OC(O)$—$C(CH_3CH_2$,
$C_6F_{13}$—$SO_2$—$N(R^1)$—$R^2$—$OC(O)$—$C(CH_3)$=$CH_2$,
$C_6F_{13}$—$CO$—$N(R^1)$—$R^2$—$OC(O)$—$C(CH_3)$=$CH_2$,
$C_6F_{13}$—$CH_2CH(OR^3)CH$—$OC(O)$—$C(CH_3)$=$CH_2$, $C_6F_{13}$—$R^2$—$SO_2$—$N(R^1)$—$OC(O)$—$C(CH_3)$=$CH_2$,
$C_6F_{13}$—$R^2$—O—$CON(R^1)$—$R^2$—$OC(O)$—$C(CH_3)$=$CH_2$,
wherein
$R^1$ is H or $C_1$-$C_4$ alkyl;
$R^2$ is $C_1$-$C_{10}$ alkylene; and
$R^3$ is H or $C_1$-$C_4$ acyl.

And the preferred fluorinated methacrylate monomers are:
$CF_3(CF_2)_5$—$CH_2CH_2$—$OC(O)$—$C(CH_3CH_2$,
$C_6F_{13}$—$CH_2CH_2$—$OC(O)$—$C(CH_3)$=$CH_2$,
and the most preferred fluorinated methacrylate monomer is:
$CF_3(CF_2)_5$—$CH_2CH_2$—$OC(O)$—$C(CH_3CH_2$.

Above fluorinated methacrylate monomers are available either from Sigma-Aldrich (St. Louis, Mo.), or from E.I. du Pont de Nemours and Company, Wilmington, Del.

The nonfluorinated acrylate monomers suitable for the use in the present invention comprise alkyl acrylates in which the alkyl group is a straight or branched chain containing 8 to 40 carbon atoms, or mixtures thereof. The preferred alkyl group for the alkyl acrylates containing 8 to 20 carbon atoms. The alkyl acrylates (linear or branched) are exemplified by, but not limited to, alkyl acrylates where the alkyl group is octyl, 2-ethylhexyl, decyl, isodecyl, lauryl, cetyl, or stearyl. The preferred examples are 2-ethylhexyl acrylate, lauryl acrylate and stearyl acrylate.

The hydroxyalkyl methacrylates have alkyl chain lengths in the range between 2 and 4 carbon atoms, and are exemplified by 2-hydroxyethyl methacrylate.

The fluorinated acrylate polymers in this invention are prepared in organic solvent by free radical initiated polymerization of a mixture of fluorinated acrylate with the other monomers as listed above for each. The fluorinated polymers in this invention are made by agitating the monomers described above in organic solvent in a suitable reaction vessel which is equipped with an agitation device and an external heating and cooling device. A free radical initiator is added and the temperature raised to from about 20° to about 70° C. The polymerization initiator is exemplified by 2,2'-azobis(2-methylbutanenitrile). These initiators are sold by E.I. du Pont de Nemours and Company, Wilmington, Del., commercially under the name of "VAZO". An example of a suitable polymerization regulator or chain transfer agent is dodecylmercaptan. Suitable organic solvents useful in the preparation of the polymers in the present invention include tetrahydrofuran, acetone, methyl isobutyl ketone, isopropanol, ethyl acetate, butyl acetate, and mixtures thereof. Butyl acetate is preferred. The reaction is conducted under an inert gas, such as nitrogen, to the exclusion of oxygen. The polymer can be isolated by precipitation, and optionally purified by for example, recrystallization. The solvent can be removed by evaporation, or is retained for dilution and application to the substrate. The product of the reaction is a fluorinated acrylate polymer. The polymer excludes any repeating units derived from vinylidene chloride.

The resulting fluorinated methacrylate polymer can be further dispersed or dissolved in a solvent selected from the groups comprising simple alcohols and ketones that are suitable as the solvent for final application to substrates (hereinafter the "application solvent"). Alternatively, an aqueous dispersion, made by conventional methods with surfactants, is prepared by removing solvents by evaporation and the use of emulsification or homogenization procedures known to those skilled in the art. Such solvent-free emulsions are preferred to minimize flammability and volatile organic compounds (VOC) concerns. The final product for application to a substrate is a dispersion (if water based) or a solution (if a solvent other than water is used) of the fluorinated methacrylate polymer.

The present invention also provides a method for treating a leather substrate comprising contacting the leather substrate with a solvent-based fluorinated methacrylate polymer composition to provide water and oil repellency, wherein the fluorinated methacrylate polymer composition comprising repeating units in any sequence from (1) at least one fluorinated methacrylate, and (2) at least one non-fluorinated alkyl acrylate and (3) at least one non-fluorinated hydroxyalkyl methacrylate, provided that:

a) the repeating unit of fluorinated methacrylate is present in a range of about 40%-80% by weight of total monomers added, b) the repeating unit of non-fluorinated alkyl acrylate is present in a range of about 10%-35% by weight of total monomers added, and c) the repeating unit of non-fluorinated hydroxyalkyl methacrylate is present in a range of about 5%-25% by weight of total monomers added, and d) the total of all repeating units is 100% by weight.

The Leather substrate is based on hides that are natural products and therefore a variable substrate. For example, the Leather substrate subjected to the treatment in the above method can be pretreated hides, i.e., with hides that had been cured, freed of flesh and excess hair, and treated by chrome tanning or an equivalent process. Such tanned hides are referred to in the industry as pelts or wet blue hides, and the term "wet blue hide stage" is used herein to describe this stage in the overall tanning process. The wet blue hides were washed and rinsed in lukewarm water to remove chemicals with which the hides had previously been treated. The next steps were buffering and character-building steps that equalized the pH of the leather and built desired characteristics such as suppleness into the hides. Retanning of the hides was continued by treating them with additional character builders to enhance and impart additional desirable characteristics.

In the method of the present invention, the process of contacting the leather substrate with the solvent-based fluorinated methacrylate polymer can be carried out by any suitable methods. Such methods are known to those skilled in the art, and include for example, application by spray, dipping, foam, nip, immersion, brush, roller, sponge, mat, and similar conventional techniques. Application by spray, dipping and brush techniques are preferred. The leather substrate is based on hides that are natural products and therefore a variable substrate. Methods to adjust bath conditions and concentration to accommodate such natural variations are well known to those skilled in the art.

Therefore, the present invention comprises the leather substrates treated according to the above method of the present invention.

The present invention further provides a method for treating a hard surface substrate comprising contacting the hard surface substrate with a solvent-based fluorinated methacrylate polymer composition to provide water and oil repellency, and stain resistance wherein the fluorinated methacrylate polymer composition comprising repeating units in any sequence from (1) at least one fluorinated methacrylate, and (2) at least one non-fluorinated alkyl acrylate and (3) at least one non-fluorinated hydroxyalkyl methacrylate.
provided that a) the repeating unit of fluorinated methacrylate is present in a range of about 40%-80% by weight of total monomers added, b) the repeating unit of non-fluorinated alkyl acrylate is present in a range of about 10%-35% by weight of total monomers added, and c) the repeating unit of non-fluorinated hydroxyalkyl methacrylate is present in a range of about 5%-25% by weight of total monomers added, and d) the total of all repeating units is 100% by weight.

The term "hard surface", as used herein, includes porous surfaces, such as stone, masonry, concrete, unglazed tile, brick, porous clay and various other substrates with surface porosity. Specific examples of such substrates include unglazed concrete, brick, tile, stone (including granite, limestone and marble), grout, mortar, statuary, monuments, wood, composite materials such as terrazzo, and wall and ceiling panels including those fabricated with gypsum board. These are used in the construction of buildings, roads, parking ramps, driveways, floorings, fireplaces, fireplace hearths, counter tops, and other decorative uses in interior and exterior applications.

The method of the present invention of treating a hard surface to provide water and oil repellency to the substrate comprises application of the composition described above to the substrate. The composition is applied to the substrate by contacting the composition with the substrate using conventional means, including but not limited to, spray, brush, roller, doctor blade, wipe, and dip techniques, preferably using a first coating, optionally followed by one additional coat using a wet-on-wet technique. More porous substrates may require subsequent additional coats. The wet-on-wet procedure comprises applying a first coat which is allowed to soak into the substrate but not dry (e.g., for about 10-30 minutes) and then applying a second coat. Any subsequent coats are applied using the same technique as described for the second coat. The substrate surface is then allowed to dry under ambient conditions, or the drying can be accelerated by warm air if desired. The wet-on-wet application procedure provides a means to distribute or build up more of the protective coating at the substrate surface. Spray and wet-on-wet applications are preferred. And spray application is most preferred.

The present invention further comprises substrates treated according to the method of the present invention. These substrates comprise porous surfaced materials used in interior and exterior construction applications. A wide variety of construction substrates are suitable for use herein. Examples of such materials include unglazed concrete, brick, tile, stone (including granite and limestone), grout, mortar, composite materials such as terrazzo, wall and ceiling panels including those fabricated with gypsum board, marble, statuary, monuments, and wood. The treated substrates have desired water and oil repellency, and stain resistance properties.

Substrates treatable in the present invention vary widely in their porosity including less porous materials, such as granite or marble, and more porous materials, such as limestone or Saltillo. The present invention is especially suitable for providing desired water and oil repellency, and stain resistance to more porous substrates such as limestone or Saltillo. Thus limestone and Saltillo were tested in the Examples herein. A treatment that works well to provide water and oil repellency, and stain resistance to more porous substrates will also work very well for less porous substrates, although the reverse is not true. The present invention provides water and oil repellency, and stain resistance to more porous substrates while not altering their surface appearance.

EXAMPLES

Test Method 1—Water Repellency

The water repellency of a treated substrate was measured according to AATCC standard Test Method No. 193-2004 and the DuPont Technical Laboratory Method as outlined in the TEFLON Global Specifications and Quality Control Tests information packet. The test determines the resistance of a treated substrate to wetting by aqueous liquids. Drops of water-alcohol mixtures of varying surface tensions are placed on the substrate and the extent of surface wetting is determined visually. The higher the water repellency rating, the better the resistance of a finished substrate to staining by water-based substances. The composition of water repellency test liquids is shown in Table 1.

TABLE 1

| Water Repellency Test Liquids | | |
|---|---|---|
| Water Repellency | Composition, Vol. % | |
| Rating Number | Isopropyl Alcohol | Distilled Water |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Testing procedure: Three drops of Test Liquid 1 are placed on the treated substrate. After 10 seconds, the drops are removed by using vacuum aspiration. If no liquid penetration or partial absorption (appearance of a darker wet patch on the substrate) is observed, the test is repeated with Test Liquid 2. The test is repeated with Test Liquid 3 and progressively higher Test Liquid numbers until liquid penetration (appearance of a darker wet patch on the substrate) is observed. The test result is the highest Test Liquid number that does not penetrate into the substrate. Higher scores indicate greater repellency.

Test Method 2—Oil Repellency

The treated samples were tested for oil repellency by a modification of AATCC standard Test Method No. 118, conducted as follows. A substrate treated with an aqueous dispersion of polymer as previously described, is conditioned for a minimum of 2 hours at 23° C. and 20% relative humidity and 65° C. and 10% relative humidity. A series of organic liquids, identified below in Table 2, are then applied dropwise to the samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs. The oil repellency rating is the highest numbered test liquid for which two of the three drops remained spherical to hemispherical, with no wicking for 30 seconds. In general, treated samples with a rating of 5 or more are considered good to excellent; samples having a rating of one or greater can be used in certain applications.

TABLE 2

Oil Repellency Test Liquids

| Oil Repellency Rating Number | Test Solution |
|---|---|
| 1 | NUJOL Purified Mineral Oil |
| 2 | 65/35 NUJOL/n-hexadecane (v/v) at 21° C. |
| 3. | n-hexadecane |
| 4 | n-tetradecane |
| 5 | n-dodecane |
| 6 | n-decane |
| 7 | n-octane |
| 8 | n-heptane |

Note:
NUJOL is a trademark of Plough, Inc., for a mineral oil having a Saybolt viscosity of 360/390 at 38° C. and a specific gravity of 0.880/0.900 at 15° C.

Test Method 3. Determination of Stain Resistance.

12"×12" tiles of the stones to be evaluated (e.g., Walker Zanger Alhambra Limestone, Cashmere White Granite, Walker Zanger White Venatino Marble (if tested), and Saltillo tile, also known as Mexican clay tile, etc.) Begin by rinsing the substrate under tap water; be sure to wet the entire substrate in order to remove any dust or debris from the surface. Remove any excess water on the surface using a lint free cloth such as a Sontara® wipe. The substrate is then placed in a fan forced oven with a temperature setting of 60 C for 2 hours. Remove the substrate and allow too cool for a minimum of 15 minutes. Each tile is evenly divided into 10 sections using electrical tape to partition the test area. (This will help reduce cross-contamination of products).

Treating solutions are made by diluting the sealer product candidates in water or solvent to the desired treating concentration. Product is applied to the tiles using a 1" polyester bristle paint brush and allowed to dry for ten minutes before removing any excess liquid with the same brush. If applying a solvent-based solution, use a Sontara nonwoven cloth. After the accelerated drying process apply the desired coating(s) to the substrate(s). Put the substrate back into the oven at 60 C for 60 minutes. Remove the substrate and allow too cool for a minimum of 15 minutes. After the accelerated drying and curing processes stain test analysis can be performed. If applicable; the treated tile samples are allowed to sit for an additional 30 minutes before applying the second coat. The process is repeated until the number of desired coats has been applied. Typically, two coats of product are applied to the substrate. (The number of coats applied depends on the porosity of the substrate.)

The following food stains were placed at intervals on the surface of the treated and dried limestone and Saltillo tiles and allowed to remain on the tile for 24 hours: 1) coke, 2) mustard, 3) bacon grease, 4) motor oil, 5) black coffee, 6) lemon juice, 7) grape juice, 8) ketchup, 9) Italian salad dressing, 10) canola oil.

After a 24-hour period, the food stains were blotted or lightly scraped from the tile surface. The tile's surface was rinsed with water and a stiff nylon bristle brush was used to scrub the surface to remove any remaining dried food residue. The tiles were then rinsed with water and allowed to dry for at least 24 hours before rating.

The stains remaining on the tile surfaces after cleaning were rated visually according to a scale of 0 to 4 as follows: 0=no stain; 1=very light stain; 2=light stain; 3=moderate stain; and 4=heavy stain. The ratings for each substrate type are summed for each of the stains to give a composite rating for each substrate. The maximum total score for each substrate was 9 stains times the maximum score of 4 per stain=36. Thus, the maximum composite score for both substrates (limestone and Saltillo) was two times the maximum score per substrate (36)=72. Lower scores indicate better stain protection with scores of 30 or less being acceptable and with zero indicating the best protection with no stain present.

Test Method 4. Visual Water and Oil Beading.

The Visual Water and Oil Beading method is used to measure water or oil repellency. Three drops of deionized water or vegetable oil are placed on each substrate. After all drops of deionized water or oil are placed onto the tiles and allowed to sit for 5 minutes, the Visual Water and Oil Beading Chart is used to rate the contact angle using a 0 to 5 scale, with 0 representing penetration of the liquid into the substrate and 5 representing excellent beading. (See rating chart below.)

| | |
|---|---|
| 5 Contact angle 100-120° | 4 Contact angle 75-90° |
| 3 Contact angle 45-75° | 2 Contact angle 25-45° |
| 1 Contact angle 10-25 | 0 Contact angle <10° |

Example 1

A reactor was equipped with a water cooled condenser, thermocouple, overhead stirrer, and nitrogen sparge. Butyl acetate (264.83 gram), stearyl acrylate (SA) (103.68 gram), 2-hydroxyethyl methacrylate (HEMA) (25.15 gram) and $CF_3(CF_2)_5CH_2CH_2OC(O)C(CH_3)CH_2$ which is available from E.I. du Pont de Nemours and Company, Wilmington, Del., were charged. Butyl acetate was used to rinse beaker. Reactor was heated to 50° C. and sub-surface sparged for 30 minutes, agitator was set to 200 rpm. After 30 min sparge was switched to blanket. Temperature was raised to 75° C. and solution 1 of VAZO 67 (2.68 gram), which is available from E.I. du Pont de Nemours and Company, Wilmington, Del., in butyl acetate (72.93 gram) was added. Temperature was held for 5 hours, at beginning of fifth hour a second addition of initiator VAZO 67 (1.34 gram) in butyl acetate (72.93 gram) was made. Reaction was set to ramp to 100° C. over one hour. The reactor was cooled to ambient room temperature after an additional 2 hours of heating. The total solvent butyl acetate (641.02 gram) was added to the reactor and the mixture stirred for 30 min to provide a 25% actives polymer solution which contained actual 35.85% solids. The above product was then made into a sampling solution which contained 2.0% solids and used in the following tests for leather water and oil repellency according to the test methods described above. The results were shown in table 3.

Comparative Example A

A fluorinated water/oil repellent and stain resistant, which is available as ZONYL 225 from E.I. du Pont de Nemours and Company, Wilmington, Del., was also made into a 2.0% solids solution and used in the tests for leather water and oil repellency following the same procedures described above. The results were shown in table 3.

TABLE 3

Leather Water and Oil repellency

| Fluorine Content | 3500 ppm F | | 2625 ppm F | | 1750 ppm F | |
|---|---|---|---|---|---|---|
| | WR* | OR* | WR* | OR* | WR* | OR* |
| Example 1 | 8 | 5 | 8 | 4 | 7 | 4 |
| Comp. Example A | 7 | 5 | 7 | 3-4 | 5 | 2-1 |

WR* for water repellency, and OR* for oil repellency

Example 2

The above product from Example 1 was then made into a sampling solution which contained 2.0% solids and used in the hard surface stain resistance tests, and water/oil repellency tests according to the test methods described above. The results were shown in table 4.

Comparative Example B

A fluorinated water/oil repellent and stain resistant, which is available as ZONYL 225 from E.I. du Pont de Nemours and Company, Wilmington, Del., was also made into a 2.0% solids solution and used in the hard surface stain resistance tests, and water/oil repellency tests according to the test methods described above. The results were shown in table 4.

TABLE 4

Tests results on Hard Surfaces

| | Materials | | | |
|---|---|---|---|---|
| | Saltillo | | Porto Beige Limestone | |
| | Examples | | | |
| | Exmp. 2 | Com. Exmp. B | Exmp. 2 | Com. Exmp. B |
| Amt. Applied (g) | 0.59 | 0.47 | 0.23 | 0.21 |
| % Solids | 2.00 | 2.00 | 2.00 | 2.00 |
| Food Stains | — | — | — | — |
| Coke | | 1 | 2 | 1 |
| Mustard | 3 | 1 | 1 | 1 |
| Bacon Grease | 2 | | 2 | |
| Motor Oil | 2 | 2 | 1 | 2 |
| Coffee | 2 | 2 | 2 | 3 |
| Lemon Juice | 2 | 1 | 3 | 3 |
| Grape Juice | | | 1 | 2 |
| Ketchup | 1 | 2 | 2 | 2 |
| Italian Dressing | 2 | | 1 | 1 |
| Canola Oil | 2 | 2 | | |
| Total Repellency | 16 | 11 | 15 | 15 |
| Water Beading | 5 | 5 | 2 | 4 |
| Oil Beading | 5 | 5 | 4 | 5 |

Example 3

A reactor was equipped with a water cooled condenser, thermocouple, overhead stirrer, and nitrogen sparge. Methyl isobutyl ketone (42.95 gram), stearyl acrylate (SA) (11.6 gram), 2-hydroxyethyl methacrylate (HEMA) (6.09 gram) and $CF_3(CF_2)_5CH_2CH_2OC(O)C(CH_3)CH_2$ (25.77 gram) which is available from E.I. du Pont de Nemours and Company, Wilmington, Del., were charged. Methyl isobutyl ketone was used to rinse beaker. Reactor was heated to 50° C. and sub-surface sparged for 30 minutes, agitator was set to 200 rpm. After 30 min sparge was switched to blanket. Temperature was raised to 80° C. and solution 1 of VAZO 67 (0.15 gram), which is available from E.I. du Pont de Nemours and Company, Wilmington, Del., in methyl isobutyl ketone (2.0 gram) was added. Temperature was held for 5 hours, at beginning of fifth hour a second addition of initiator VAZO 67 (0.16 gram) in methyl isobutyl ketone (1.0 gram) was made. Reaction was set to ramp to 100° C. over one hour. The reactor was cooled to ambient room temperature after an additional 2 hours of heating. The total solvent methyl isobutyl ketone was added to the reactor and the mixture stirred for 30 min to provide a 35% actives polymer solution. The above product was then made into a sampling solution which contained 2.0% solids and used in the following tests for leather water and oil repellency according to the test methods described above. The results were shown in table 5.

Comparative Example C

The above product from Example 3 was then made into an aqueous dispersion which contained 2.0% solids by combining Witco C6094 (2.0 gram) with distilled water (29.5 gram) and heated to 70° C. in a water bath. The above product Example 3 (25.0 gram) was combined with the Witco C6094 solution in a plastic beaker and sonified for 4 minutes. The resulting solution was then stripped of methyl isobutyl ketone on the rotovap used in the following tests for leather water and oil repellency according to the test methods described above. The results were shown in table 5.

TABLE 5

Leather Water and Oil replellency

| | Fluorine Content 3500 ppm F | |
|---|---|---|
| | WR* | OR* |
| Example 3 | 6 | 3 |
| Example C | 3 | 0 |

WR* for water repellency, and OR* for oil repellency

As shown in Table 5 above, when the fluoropolymer of the invention is made into a dispersion with water, water and oil repellency performance drops significantly compared with when the fluoropolymer of the invention is made into a non-aqueous composition.

Comparative Example D

A reactor was equipped with a water cooled condenser, thermocouple, overhead stirrer, and nitrogen sparge methyl isobutyl ketone (42.95 gram), stearyl acrylate (SA) (11.6 gram), 2-hydroxyethyl methacrylate (HEMA) (6.09 gram) and $CF_3(CF_2)_5CH_2CH_2OC(O)C(CH_3)CH_2$ (25.77 gram) which is available from E.I. du Pont de Nemours and Company, Wilmington, Del., and vinylidene chloride (4.5 gram) were charged. Methyl isobutyl ketone was used to rinse beaker. Reactor was heated to 50° C. and sub-surface sparged for 30 minutes, agitator was set to 200 rpm. After 30 min sparge was switched to blanket. Temperature was raised to 80° C. and solution 1 of VAZO 67 (0.15 gram), which is available from E.I. du Pont de Nemours and Company, Wilmington, Del., in methyl isobutyl ketone (2.0 gram) was added. Temperature was held for 5 hours, at beginning of fifth hour a second addition of initiator VAZO 67 (0.16 gram) in methyl isobutyl ketone (1.0 gram) was made. Reaction was set to ramp to 100° C. over one hour. The reactor was cooled to ambient room temperature after an additional 2 hours of heating. The total solvent methyl isobutyl ketone was added to the reactor and the mixture stirred for 30 min to provide a 35% actives polymer solution. The above product was then made into a sampling solution which contained 2.0% solids and used in the following tests for leather water and oil repellency according to the test methods described above. The results were shown in table 6.

Comparative Example E

A reactor was equipped with a water cooled condenser, thermocouple, overhead stirrer, and nitrogen sparge. Methyl isobutyl ketone (42.95 gram), stearyl methacrylate (SMA) (11.6 gram), 2-hydroxyethyl methacrylate (HEMA) (6.09 gram) and $CF_3(CF_2)_5CH_2CH_2OC(O)C(CH_3)CH_2$ (25.77 gram) which is available from E.I. du Pont de Nemours and Company, Wilmington, Del., were charged. Methyl isobutyl ketone was used to rinse beaker. Reactor was heated to 50° C. and sub-surface sparged for 30 minutes, agitator was set to 200 rpm. After 30 min sparge was switched to blanket. Temperature was raised to 80° C. and solution 1 of VAZO 67 (0.15 gram), which is available from E.I. du Pont de Nemours and Company, Wilmington, Del., in methyl isobutyl ketone (2.0 gram) was added. Temperature was held for 5 hours, at beginning of fifth hour a second addition of initiator VAZO 67 (0.16 gram) in methyl isobutyl ketone (1.0 gram) was made. Reaction was set to ramp to 100° C. over one hour. The reactor was cooled to ambient room temperature after an additional 2 hours of heating. The total solvent methyl isobutyl ketone was added to the reactor and the mixture stirred for 30 min to provide a 35% actives polymer solution. The above product was then made into a sampling solution which contained 2.0% solids and used in the following tests for leather water and oil repellency according to the test methods described above. The results were shown in table 6.

TABLE 6

Leather Water and Oil repellency

| | Fluorine Content 3500 ppm F | |
|---|---|---|
| | WR* | OR* |
| Example 3 | 6 | 3 |
| Example D | 3 | 0 |
| Example E | 5 | 1 |

WR* for water repellency, and OR* for oil repellency

As shown in Table 5 above, when vinylidene chloride is incorporated into the fluoropolymer of the invention (Example D) water and oil repellency performance drops significantly compared with when no vinylidene chloride is incorporated (Example 3). As shown in Table 5 above, when stearyl methacrylate is incorporated into the fluoropolymer of the invention (Example E) water and oil repellency performance drops significantly compared with when stearyl acrylate is incorporated instead (Example 3).

What is claimed is:

1. A fluorinated methacrylate polymer composition comprising repeating units in any sequence from (1) at least one fluorinated methacrylate, and (2) at least one non-fluorinated alkyl acrylate and (3) at least one non-fluorinated hydroxyalkyl methacrylate,
provided that
a) the repeating unit of fluorinated methacrylate is present in a range of from 40% to 80% by weight of total monomers added,
b) the repeating unit of non-fluorinated alkyl acrylate is present in a range of from 10% to 35% by weight of total monomers added, and
c) the repeating unit of non-fluorinated hydroxyalkyl methacrylate is present in a range of from 5% to 25% by weight of total monomers added, and
d) the total of all repeating units is 100% by weight;
wherein the fluorinated methacrylate is: $CF_3(CF_2)_5$—$CH_2CH_2$—$OC(O)$—$C(CH_3)$=$CH_2$, the non-fluorinated alkyl acrylate is stearyl acrylate, the non-fluorinated hydroxyalkyl methacrylate is 2-hydroxyethyl methacrylate, and
the fluorinated methacrylate polymer composition is solvent-based and non-aqueous.

2. A method for treating a leather substrate comprising contacting the leather substrate with a solvent-based fluorinated methacrylate polymer to provide water and oil repellency, wherein the fluorinated methacrylate polymer comprises repeating units in any sequence from (1) at least one fluorinated methacrylate, and (2) at least one non-fluorinated alkyl acrylate and (3) at least one non-fluorinated hydroxyalkyl methacrylate,
provided that
a) the repeating unit of fluorinated methacrylate is present in a range of from 40% to 80% by weight of total monomers added,
b) the repeating unit of non-fluorinated alkyl acrylate is present in a range of from 10% to 35% by weight of total monomers added, and
c) the repeating unit of non-fluorinated hydroxyalkyl methacrylate is present in a range of from 5% to 25% by weight of total monomers added, and
d) the total of all repeating units is 100% by weight;
wherein the fluorinated methacrylate is $CF_3(CF_2)_5$—$CH_2CH_2$—$OC(O)$—$C(CH_3)$=$CH_2$, the non-fluorinated alkyl acrylate is stearyl acrylate the non-fluorinated hydroxyalkyl methacrylate is 2-hydroxyethyl methacrylate, and the fluorinated methacrylate polymer composition is solvent-based and non-aqueous.

3. The method of claim 2 wherein the contacting is by spray, dipping, foam, nip, immersion, brush, roller, sponge, or mat techniques.

4. The method of claim 2 wherein the contacting is by spray, dipping, or brush techniques.

5. A method for treating a hard surface substrate comprises contacting the hard surface substrate with a solvent-based fluorinated methacrylate polymer to provide water repellency, oil repellency, and stain resistance wherein the fluorinated methacrylate polymer comprises repeating units in any sequence from (1) at least one fluorinated methacrylate, and (2) at least one non-fluorinated alkyl acrylate and (3) at least one non-fluorinated hydroxyalkyl methacrylate,
provided that
a) the repeating unit of fluorinated methacrylate is present in a range of from 40% to 80% by weight of total monomers added,
b) the repeating unit of non-fluorinated alkyl acrylate is present in a range of from 10% to 35% by weight of total monomers added, and
c) the repeating unit of non-fluorinated hydroxyalkyl methacrylate is present in a range of from 5% to 25% by weight of total monomers added, and
d) the total of all repeating units is 100% by weight wherein the fluorinated methacrylate is $CF_3(CF_2)_5$—$CH_2CH_2$—$OC(O)$—$C(CH_3)$=$CH_2$, the non-fluorinated alkyl acrylate is stearyl acrylate, the non-fluorinated hydroxyalkyl methacrylate is 2-hydroxyethyl methacrylate, and the fluorinated methacrylate polymer composition is solvent-based and non-aqueous.

6. The method of claim 5 wherein the contacting is by brush, spray, roller, doctor blade, wipe or dip techniques.

7. The method of claim 5 wherein the contacting is by spray or wet-on-wet techniques.

8. The method of claim 5 wherein the hard surface substrate is unglazed concrete, brick, tile, stone, granite, limestone, grout, mortar, composite materials, terrazzo, gypsum board, marble, statuary, monuments, or wood.

* * * * *